July 6, 1965
G. L. HAMMON
3,192,987
GAS TORCHES
Original Filed April 18, 1960
2 Sheets-Sheet 1
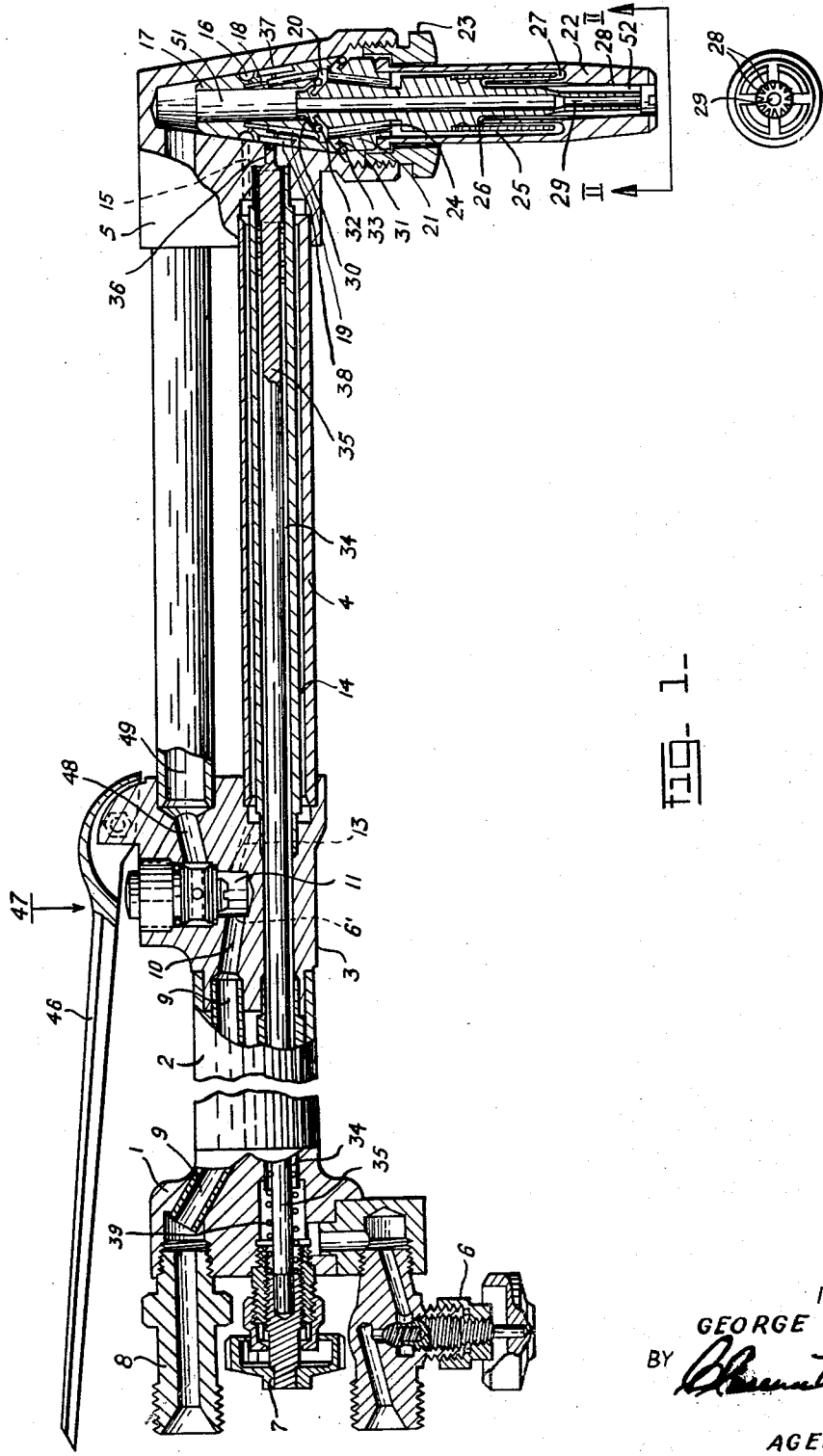
FIG-1-
FIG-2-
INVENTOR
GEORGE L. HAMMON
BY 
AGENT July 6, 1965   G. L. HAMMON   3,192,987
GAS TORCHES
Original Filed April 18, 1960   2 Sheets-Sheet 2
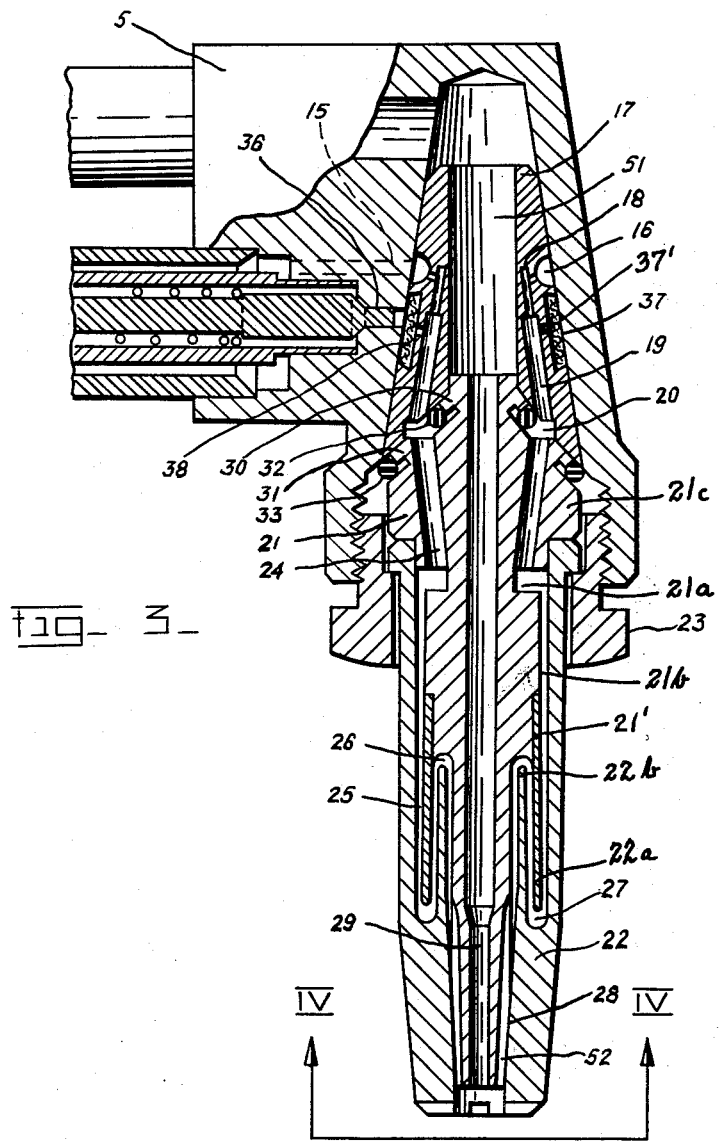
Fig. 3.
Fig. 4.
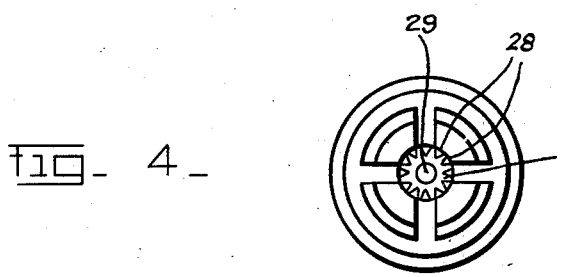
INVENTOR.
GEORGE L. HAMMON
BY
AGENT United States Patent Office 3,192,987
Patented July 6, 1965

3,192,987
GAS TORCHES
George L. Hammon, Oakland, Calif., assignor to Hammon Precision Equipment Company, Oakland, Calif., a corporation of California
Original application Apr. 18, 1960, Ser. No. 22,944. Divided and this application Apr. 23, 1962, Ser. No. 189,484
5 Claims. (Cl. 158—27.4)

The present invention relates to improvements in cutting and welding torches by means of which petroleum products may be used in place of the usual acetylene gases. The invention is a division of the United States patent application S.N. 22,944, filed April 18, 1960.

An object of this invention is to provide an improved torch.

Another object is to provide a cutting and welding torch which uses liquid petroleum and oxygen under pressure to produce an extremely hot and steady flame.

Still another object is to provide a torch of the above character in which liquid petroleum products are transformed into a gassy state without requiring the use of auxiliary heating generators or the like.

Still another object is to provide a torch of the above character in which liquid petroleum products cannot flow out of the torch when the torch is not in use.

The above objects and others will become apparent from the following description of the drawings in which:

FIG. 1 is a side view, partially in section, of the welding and cutting torch;
FIG. 2 is a view taken along the line II—II of FIG. 1;
FIG. 3 is an enlarged view of the head of the torch; and
FIG. 4 is an enlarged view taken along the line IV—IV of FIG. 3.

The main body of the torch comprises a plurality of sections 1, 2, 3, 4, and 5 (FIG. 1) which are made separately for manufacturing ease and then assembled as an integral unit to form the torch body. Section 1 has three internally threaded portions to receive three respective nipples. Nipples 6 and 7 comprise a pair of valves for controlling the flow of liquid petroleum into the torch. The valve 7 is a fine adjustment valve which, when adjusted under working conditions, may be left set in such position while the valve 6 is merely used for turning the flow of petroleum, or gasoline, on and off. The nipple 8 is connected to an oxygen input line and oxygen flows directly through the nipple, an internal tube 9, and a passageway 10 where it enters a chamber 11. From the chamber 11 the oxygen is controlled by a valve generally indicated at 6' and similar to the valve 6, which valve 6' controls the flow of oxygen through the small passage 13 to the enlarged passage 14. From the passage 14 the oxygen passes through a small tube 15 where it empties into an annular groove 16 formed in a mixer unit 17 (FIG. 3). A plurality of pasages 18 have connection with the groove 16 to transmit oxygen to a plurality of aspirating passages 19, where, as described hereinafter, the gasoline is mixed with the oxygen. Then the mixed gases flow into an annular chamber 20 enclosed between the bottom of the mixer unit 17 and the top part 21 of a two part cutting tip 21–22.

The two parts 21 and 22 are held together by means of a locking nut 23 which also serves to hold the cutting tip within portion 5 of the torch in closely abutting relationship with the mixer unit 17. From the annular chamber 20 the mixed gases flow through a plurality of ports 24 cut through an enlarged circular head 21c of the first part and into a chamber formed by a recess 21a in part 21 and a portion of part 22. Then the gases flow through a passage 25 formed between the inner wall of part 22 and the outer wall of a shank portion 21b of part 21 and its integral shell 21'. It should be noted that the part 21 is recessed as at 26 and that part 22 is recessed as at 27 so that a pair of annular prongs 22a and 22b are formed which interlock with each other to form an elongated, circuitous pathway extending from passage 25 to the outlet passage 28. When the torch is not in use some gases may condense within the tip, and the pathway which doubles back upon itself prevents the condensed vapors from accidentally emerging from the end of the torch and causing a hazard.

The terminal portion of the tip portion 21 is fluted as at 52 to increase the velocity of gas as it emerges from the tip. The outer circumference of the flutes contacts the inner wall of tip 22 and the flutes thus form a circular array of passages about a central oxygen port 29.

Although the walls which form the circuitous pathway 25, 26, 27 and 28 are, for purposes of illustration only, shown as being spaced apart to a considerable extent in FIG. 3, it should be noted that, in actual practice, the opposed walls are spaced apart only by a minimal amount which is in keeping with economical manufacturing practices. Preferably the walls are almost in contact with each other so that when the petroleum makes initial contact with one wall it immediately spreads to the opposite wall and flows along the walls due to capillary action. Meanwhile, even a minimal heat generated at the tip of the torch when it is initially lit is transferred to the walls of the passageway and, this action, when combined with the spreading action of the petroleum on the walls, produces a flash conversion so that the torch is ready for instantaneous use.

One of the problems encountered in torches of the type mentioned has been in providing a good seal between the mixer unit and the cutting tip. According to the invention, the upper portion 21 of the cutting tip is formed with a pair of annular skirts 30 and 31 which bear against respective shoulders of the mixer unit 17. These skirts flex slightly during the tightening of the nut 23 to permit the formation of an extremely tight seal without overstressing the mating parts.

It also has been found that a sealing ring such as one of the rings 32 and 33 may be provided to encircle each skirt 30, 31. The ring preferably is of such dimension that the upper edge of the ring projects slightly above the skirt. When the nut 23 is tightened and the skirts 30, 31 are moved into sealing relationship with the mixer unit, the rings are compressed and assist in such sealing action. Furthermore, since rings 32, 33 normally project above the skirts, the rings serve to protect the parts prior to assembly and during handling. It will be noted that if the upper portion 21 of the cutting tip were dropped on one of the unprotected skirts, the skirt would possibly become deformed and permit the escape of gas past the intended sealing surfaces. The rings, however, absorb such shock, and at worst, may be easily replaced, thus saving the price and inconvenience of replacing the tip 21.

Gasoline or other suitable liquid petroleum passes, under pressure, through the two valves 6 and 7 (FIG. 1) and emerges into a passage 34 extending the full length of the cutting torch from valve 7 to portion 5 of the torch. A valve stem 35 is fixed to the valve knob 7 and extends the full length of the tube 34. At its rightmost end the valve stem seats against the reduced shoulder 36. A spring 39, only a portion of which is shown, encircles the valve stem for the full length thereof and forms a spiral passageway for the liquid petroleum. The right end of the spring abuts a shoulder formed on the right end of the valve stem. With the valve seat 36 being located closely adjacent the mixer unit 17, a minimum amount of liquid petroleum stands between the valve seat and the torch head, thus virtually eliminating the tendency of the torch to drip when the valve is closed. Another advantage inherent in the above described arrangement is that in cases where backflash may be possible, then during such backflash the spring 39 which is closely confined within the walls of tube 34 as shown in FIG. 1 is compressed and the torch becomes self extinguishing.

The flow of gasoline through tube 34 and around spring 39 is restricted to a rate which is sufficient to maintain a wide range of burning operations of the torch but prevents the operator from accidentally or purposely forcing an excess of gasoline through the tube by shaking the torch. Such accidental tendency to force may occur during the knocking of slag off of the burning tip or by any movement of the torch involving a centrifugal force tending to force the gasoline towards the cutting tip. If such restricting means were not provided then an excess of gasoline could conceivably be forced into the burning tip thus changing the mixture or possibly even extinguishing the flame.

Petroleum is transmitted from the valve face 36 (FIG. 3) into an annular space 37 formed within the mixer unit 17. A porous wick band 38 is provided in the annular space 37 and encircles the mixer unit. The wick band insures that an equal amount of liquid fuel is distributed to a plurality of connecting ports 37' which empty into the previously mentioned passage 19. In the absence of the wick band 18, the petroleum would tend to concentrate upon flowing through the port 37' which is nearest to the valve seat 36 to the exclusion of the other ports 37', thus mitigating against the proper mixing of the petroleum and oxygen in the mixer unit 17.

The shape of the passages 19 is such that the oxygen under pressure, in moving from the smaller upper end into the enlarged lower end, produces a low pressure area tending to draw the gasoline into mixture with the oxygen. The mixed gasses then empty into the annular chamber 20 as previously described. The flow of gases, now mixed, continues through the ports 24, through the passageway 25, 26, 27, 28 and are emitted at the lower end of the tip 22 where they are ignited.

When the valves have been properly adjusted to cause a flame to heat the object to the proper cutting temperature, the valve handle 46 (FIG. 1) is depressed to cause opening of a valve generally indicated at 47. Such valve opening permits the flow of pure oxygen from the chamber 11 through a passage 48 and a long passageway 49 to a chamber in the upper end of portion 5 of the torch. From there the pure oxygen is forced through a central aperture 51 of the mixer unit and through the central opening 29 of the tip 22 where it emerges in the center of the previously described flame to cause a cutting action in the usual manner.

The terminal face of the tip end has been cross milled as at 60 (FIG. 4) so that the flame cannot be extinguished even though the tip is accidentally brought in close proximity to the working surface of the metal to be heated or cut.

With the use of the above described torch it has been found that two gallons of gasoline provide up to twenty hours of operation of the torch with an 80% oxidizing action versus 50% oxidizing action for acetylene. Furthermore, not only does the torch lend itself to the use of liquid fuels with improved action, but at the same time, it provides a torch in which butane, propane, and acetylene may be used interchangeably. Since these fuels are readily accessible and under lower pressures than acetylene, it will be observed that the torch of this invention lends itself not only to commercial use but also to the occasional user who may not wish to tie up capital in the investment of the more costly acetylene storage equipment. Thus, the torch is seen to be more economical, more efficient, hotter, and more readily available for commercial and occasional use.

I claim:

1. A gas torch for mixing a liquid and a vapor comprising a body portion and a mixer unit therein, two separate annular spaces formed between said body portion and said mixer unit, a plurality of aspirating tubes in said mixer unit, a first plurality of ports in said mixer unit for transmitting vapor under high pressure from a first one of said annular spaces into said aspirating tubes, a second plurality of ports between a second one of said annular spaces and said aspirating tubes, said second plurality of ports being located downstream from said first plurality of ports, means for supplying a liquid under relatively lower pressure to said second annular space whereby the vapor, in passing through the aspirating tubes draws liquid into said tubes and mixes therewith, and a wick in said second annular space for metering substantially the same amount of liquid to each of said second plurality of ports.

2. A burning tip for a gas torch comprising a first part and a second part, said first part having an enlarged circular head and a shank smaller in diameter than the head with an annular first recess between the head and the shank, a plurality of gas tubes extending from the exterior of the head into said first recess, a second recess in the end of the shank formed by an annular first prong surrounding a remaining internal portion of the shank, the second part being formed with two inside walls the larger of which extends over the first recess and a portion of the head on the first part, a third recess formed in a shoulder between the two inside walls of the second part thus forming a second prong, which second prong rests within the larger first prong, the two parts thus forming a circuitous pathway from said head to the end of the second part which pathway is substantially longer than the length of the burning tip to thereby facilitate heat transfer from the burning tip to gases within the pathway.

3. A burning tip for a gas torch comprising two tubular members, the first member having a circular head portion and a shank portion of smaller diameter than the head portion, and at least one gas entry tube extending from the exterior of the top of the head to the exterior of the bottom of the head, a circular prong integral with and extending over the shank portion to thereby form a recess between the prong and the shank portion, said second tubular member being formed with two inside walls of different dimensions, the larger inside wall fitting over a portion of the head of the first member, a second recess formed in a shoulder between said two inside walls to form a circular prong interiorly of said second member and extending within the prong of the first member, thus forming an annular trap for condensed gasses within the burning tip.

4. A gas torch as defined in claim 3 including respective apertures extending through the center of both the first and second members, said apertures being coaxially aligned with each other to provide a straight pathway for an oxidizing gas and which straight pathway is centrally located with respect to said elongated pathway.

5. A gas torch having means for mixing a liquid petroleum product and an oxidizing gas, means for transmitting the mixture to a gas burning tip, said tip comprising two elements each having a circular prong, said prongs having annular walls of different diameters and open ends facing each other and which prongs are intermeshed with each other in very closely spaced relationship to each other to form a circuitous passageway between the mixing means and the end of the burning tip, a passageway for transmitting the gas mixture including the liquid petroleum between said first transmitting means and said circuitous passageway the transfer of heat from the burning tip to the mixture within said passageway causing flash conversion of the liquid petroleum product in said mixture into a gaseous form.

(References on following page)

References Cited by the Examiner

UNITED STATES PATENTS

| | | | |
|---|---|---|---|
| 1,271,498 | 7/18 | Blanchard | 158—109 |
| 1,578,311 | 3/26 | Grosset | 285—332 |
| 2,376,413 | 5/45 | Babcock | 158—27.4 |
| 2,404,590 | 7/46 | Nantz | 158—27.4 |
| 2,511,718 | 6/50 | Kirkham | 158—27.4 |
| 2,746,486 | 5/56 | Gratzmuller | 285—110 |
| 2,921,742 | 1/60 | Johnsyn | 239—590 |
| 3,091,281 | 5/63 | Clark | 158—27.4 |

JAMES W. WESTHAVER, *Primary Examiner.*

FREDERICK L. MATTESON, Jr., *Examiner.*